No. 620,333.   
B. G. LAMME.  
Patented Feb. 28, 1899.

DIRECT CURRENT MOTOR AND METHOD OF OPERATING SAME.

(Application filed Dec. 16, 1897.)

(No Model.)

WITNESSES:  
Ethan T. Dodds  
Hubert C. Tener

INVENTOR  
Benj. G. Lamme

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

DIRECT-CURRENT MOTOR AND METHOD OF OPERATING SAME.

SPECIFICATION forming part of Letters Patent No. 620,333, dated February 28, 1899.

Application filed December 16, 1897. Serial No. 662,218. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Direct-Current Motors and Method of Operating the Same, (Case No. 765,) of which the following is a specification.

My invention relates to electric motors operated by direct currents; and it has for its object to provide a method of and a means for operating such motors efficiently at different speeds without varying the field-magnet excitation or the applied electromotive force.

In order to effect the running of a direct-current motor at different speeds, it is usual to either vary the electromotive force applied to its armature-winding, to vary its field-magnet excitation, or to combine these two methods.

My present invention comprises a new method and means whereby two rates of speed may be secured without employing either of the above-mentioned methods.

Figure 1:
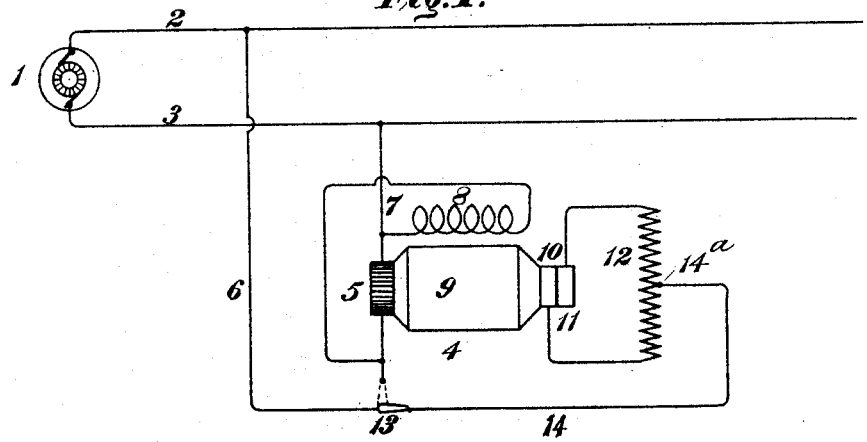
Figure 2:
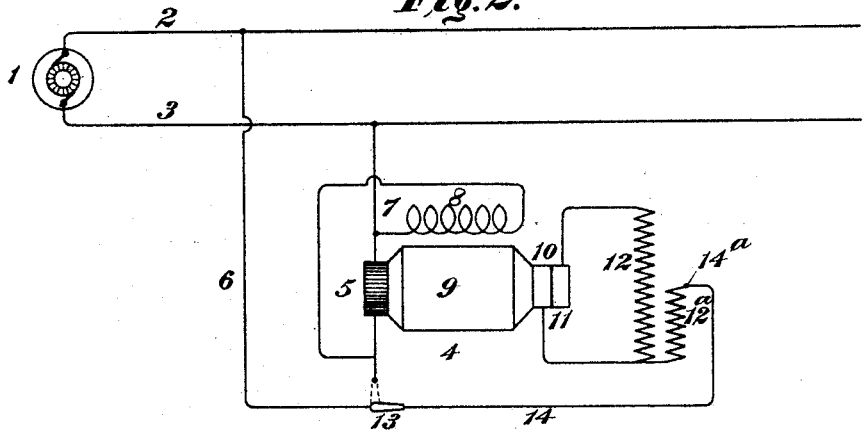

In the accompanying drawings, Figures 1 and 2 diagrammatically illustrate two different forms of apparatus for practicing my invention.

In each of the figures, 1 is a constant-potential direct-current generator, and 2 and 3 are the distribution-mains supplied by it. 4 is a motor constructed and adapted to be operated by direct currents, the commutator 5 of which may be connected by means of the leads 6 and 7 across the circuit 2 3. The field-magnet winding 8 is shunt as connected across the commutator-brushes, as is usual with what are known as "shunt-wound" machines. The winding of the armature 9 is connected both to the segments of the commutator-cylinder and to collecting-rings 10 11.

In the form of apparatus shown in Fig. 1 I provide an external circuit the terminals of which are the brushes, which respectively bear upon the collecting-rings 10 and 11, and which includes an autotransformer-winding 12. One end $14^a$ of a conductor 14 is connected to the middle point of the autotransformer-winding 12 and the other end is either connected to the conductor 6 or cut out of circuit by means of a switch 13.

In the form of apparatus shown in Fig. 2 a coil $12^a$ is employed which is of substantially one-half the length of coil 12 and is wound in the reverse direction. This coil $12^a$ is connected at one end to one end of coil 12 and at the other end to the terminal $14^a$ of conductor 14.

In all respects, except such as are specifically pointed out, the construction illustrated in Fig. 2 is the same as that illustrated in the preceding figure.

Since the electromotive force supplied to the motor 4 from the mains 2 3 is constant, it is obvious that when the switch 13 is in its dotted-line position, connecting the conductor 6 with one of the brushes of the commutator 5, the motor will run at a given constant speed, such speed being determined by the difference of potential which exists between the commutator-brushes. When the motor-circuits are as just indicated, the difference of potential between the middle point $14^a$ of the coil 12 and each of the mains 2 and 3 will be one-half the potential between the brushes of the commutator 5. This arrangement of circuits will obviously afford a maximum counter electromotive force and a minimum speed of rotation of the motor-armature.

If it be desired to run the motor at a higher speed without varying the applied electromotive force, it will be necessary to change the counter electromotive force, and this may be effected by moving the switch 13 into its full-line position, so that the external alternating circuit will be connected through the conductors 14 and 6 to the conductor 2 of the supply-circuit, the connection of the main 3 with the commutator by means of the lead 7 being undisturbed. At the instant when this change in circuit connections is made the difference of potential between the point $14^a$ and the main 2 will be zero and the difference of potential between the said point $14^a$ and the main 3 will be one-half that between the leads 6 and 7, or, what amounts to the same thing, one-half the main-line potential. The counter electromotive force will therefore obviously be one-half what it was when the switch 13 was in its dotted-line position. This condition is not maintained for any length of time, however, since the reduction in counter electromotive force will effect a rapid increase in the speed of rotation of the motor-armature until such speed becomes approximately double what it was before the change in circuit connections was made. When this double speed is attained, the difference of potential between the point 14ª and the main 3 will become equal to the main-line potential, and the motor will thereafter run at approximately double its normal speed so long as the adjusted arrangement of circuits is maintained.

I claim as my invention—

1. In a system of electrical distribution, a direct-current motor provided with a commutator and with collecting-rings and brushes, in combination with an external circuit having said brushes for its terminals and containing a transformer winding or windings, means for connecting one of the supply-mains with one of the commutator-brushes and means for connecting the other main with the other commutator-brush or with a point in said external circuit at will, in order to operate the motor at different speeds.

2. In a system of electrical distribution, a direct-current motor provided with a commutator and with collecting-rings and brushes, in combination with an external circuit having the said brushes for its terminals and containing a transformer winding or windings, means for connecting one of the supply-mains with one of the commutator-brushes and means for connecting the other main with the other commutator-brush or with a point in said external circuit the potential between which and the other commutator-brush is one-half that between the two brushes.

3. In a system of distribution, a direct-current motor provided with a commutator and with collecting-rings and brushes, in combination with an autotransformer the respective ends of the winding of which are connected to said brushes, means for connecting one side of the supply-circuit with one of the commutator-brushes and means for connecting the other side of the supply-circuit with the other commutator-brush or with the middle point of the transformer-winding, at will.

4. The method of securing different rates of speed in a direct-current motor provided with collecting-rings and with coöperating brushes constituting the terminals of an external circuit containing a transformer winding or windings, which consists in connecting the supply-mains to the commutator-brushes for one rate of speed and transferring one of said connections to the transformer-circuit for a different rate of speed.

5. The method of increasing the speed of a direct-current motor, provided with collecting-rings and with coöperating brushes connected through an autotransformer which consists in reducing the counter electromotive force by transferring one of the supply-circuit connections from a commutator-brush to the middle point of the transformer-winding.

6. The method of securing different rates of speed in a direct-current motor provided with collecting-rings and with coöperating brushes connected through the winding of an autotransformer, which consists in connecting the supply-circuit to the commutator-brushes for one rate of speed and transferring one supply-circuit connection to the middle point of the transformer-winding for a different rate of speed.

In testimony whereof I have hereunto subscribed my name this 14th day of December, 1897.

BENJ. G. LAMME.

Witnesses:
JAMES B. YOUNG,
H. C. TENER.